March 30, 1965     E. CAPAUL     3,175,466
FOUR COLUMN PLANER Filed June 14, 1961     15 Sheets-Sheet 1

March 30, 1965 E. CAPAUL 3,175,466
FOUR COLUMN PLANER
Filed June 14, 1961 15 Sheets-Sheet 4

March 30, 1965 E. CAPAUL 3,175,466
FOUR COLUMN PLANER
Filed June 14, 1961 15 Sheets-Sheet 6

March 30, 1965  E. CAPAUL  3,175,466
FOUR COLUMN PLANER
Filed June 14, 1961  15 Sheets-Sheet 11

March 30, 1965  E. CAPAUL  3,175,466
FOUR COLUMN PLANER

Filed June 14, 1961  15 Sheets-Sheet 13

Fig. 15

United States Patent Office 3,175,466
Patented Mar. 30, 1965

3,175,466
FOUR COLUMN PLANER
Eugen Capaul, Pasay, Philippines
(Hohenring 26, 8052 Zurich, Switzerland)
Filed June 14, 1961, Ser. No. 117,183
Claims priority, application Germany, Dec. 23, 1960,
C 23,023
3 Claims. (Cl. 90—34)

The present invention relates to a machine tool for the planing or milling of a work piece on the forward stroke and on the return stroke of a horizontally reciprocatable work table.

It has been attempted for a considerable time to operate planing machines in both directions of movement. For this purpose planing appliances have been developed, which can be fitted to existing one-column planing machines. None of these appliances has found acceptance in practice, since all planing machines hitherto built are suitable only for taking loads in one direction of movement.

It is known that the usual planing machines, owing to the high requirements made by the use of hard metal tools and sintered carbide tips and by the maximum cutting rates and machined areas of the work pieces have to be built so sturdily that the first costs of the machine tools are not in economic relationship to the output attained with them any more.

It is the primary object of the present invention to provide a machine tool which, in spite of comparatively light construction offers a statically faultless stiff structure and ensures a uniform withstanding of the pressures in both directions of cutting movement.

It is another object of the invention to provide such a machine tool the first costs of which are not or only unimportantly higher than those of a single acting machine tool, in spite of the almost doubled output.

It is yet another object of the invention to provide a machine tool of the kind referred to which allows in addition to planing also milling in three dimensions as well as the grinding of guide tracks.

With these and other objects in view which will become apparent later from this specification and the accompanying drawings, I provide a machine tool for machining a work piece on a forward stroke and on a return stroke, comprising in combination: a machine bed, at least four vertical columns rigidly connected at their lower ends to the said machine beds on both sides thereof, a head cross member mounted on the upper ends of the said columns bracing the same with respect to one another, a main cross beam mounted vertically slidable on the said columns, machining tools mounted on the said main cross beam, screw threaded spindles in driving connection with the said main cross beam for the vertical moving of the latter, and hydraulic clamping elements capable of engaging and clamping the said main cross beam on the said columns.

Lateral cross beams may be arranged in addition on the columns on each side of the worktable, and operated in a similar way.

A carrier for a tool holder support is preferably mounted pivotally on the said main cross beam and on each side cross beam, if any, an alternate tool holder support is mounted on the said carrier, and two tool holders are slidably mounted on each of the said supports, means being provided for bringing each tool holder in an operative position for one direction of movement of the said work table and for arresting it in said position, while the tool holder for the opposite direction of movement is made inoperative.

Preferably adjustable wedge-profile ledges are provided in the guide tracks of all mutually slidable components in order to eliminate as far as possible any play between them.

These and other features of my said invention will be clearly understood from the following description of an embodiment and of some modifications thereof given by way of example with reference to the accompanying drawings, in which.

Figure 1:
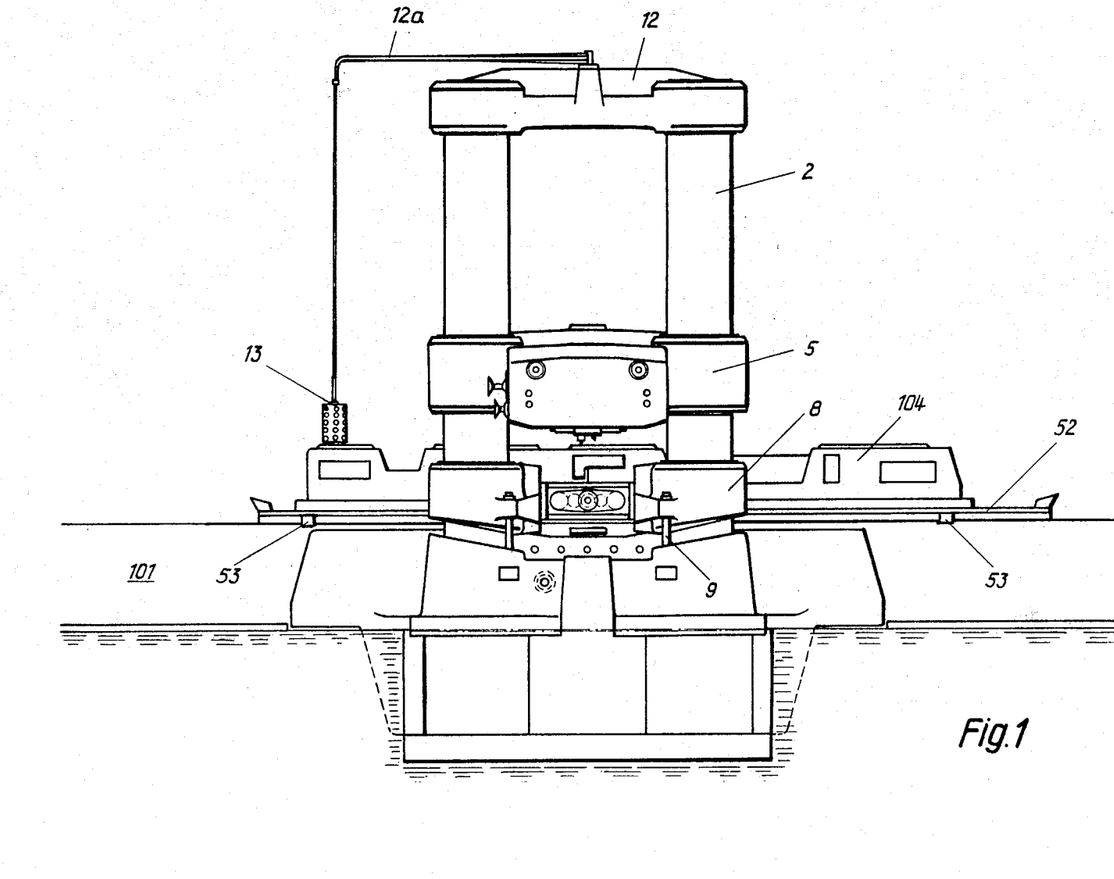
FIG. 1 is a side elevation of a planing machine according to the invention.

The bed 101 of the planing machine has the usual construction. It consists of cast iron and is stiffened by diagonal ribs 102. In the longitudinal direction there are two V-shaped guide tracks 103 provided for the planing table 52. The planing table 52 is likewise of conventional construction, having longitudinal T-grooves for the clamping-on of the work piece 104 to be machined (FIG. 1). Since planing is carried out during the advance and during the return run, two hydraulic drive cylinders 1, working alternately, are provided for the driving of the planing table 52, i.e. one cylinder 1 on either side of the upright (FIGS. 2 and 3).

Figure 2:
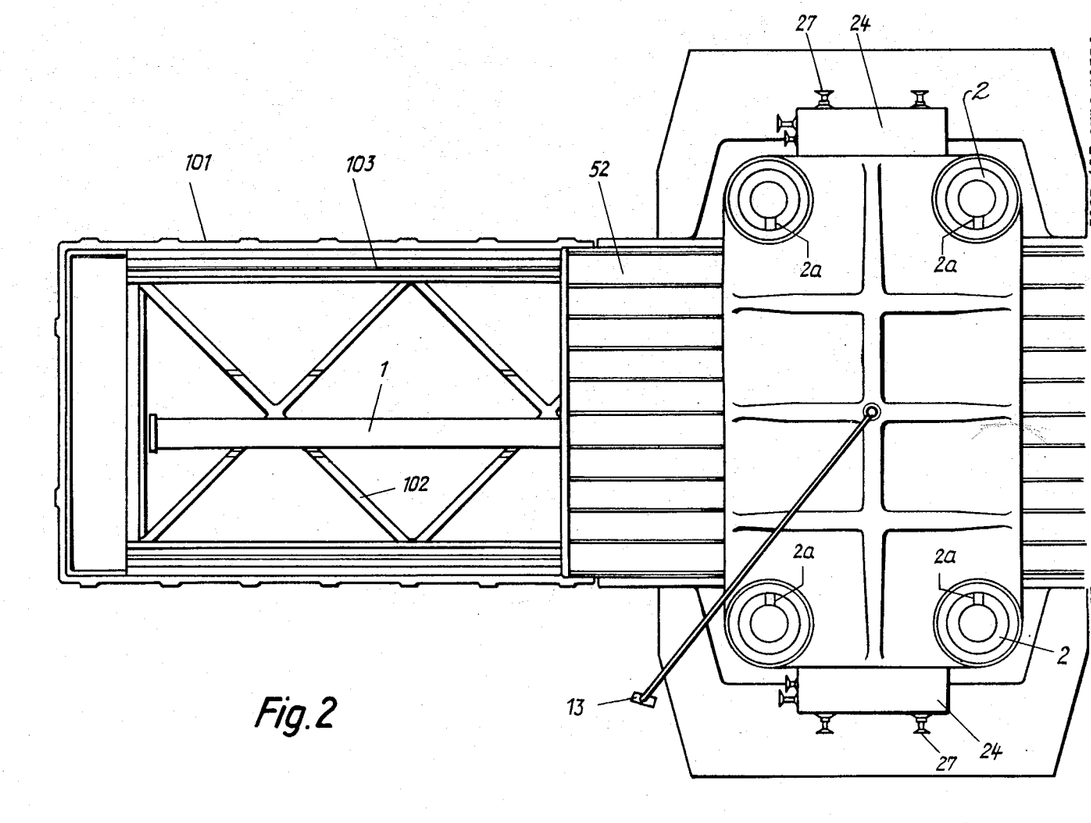
FIG. 2 is a plan view.
Figure 3:
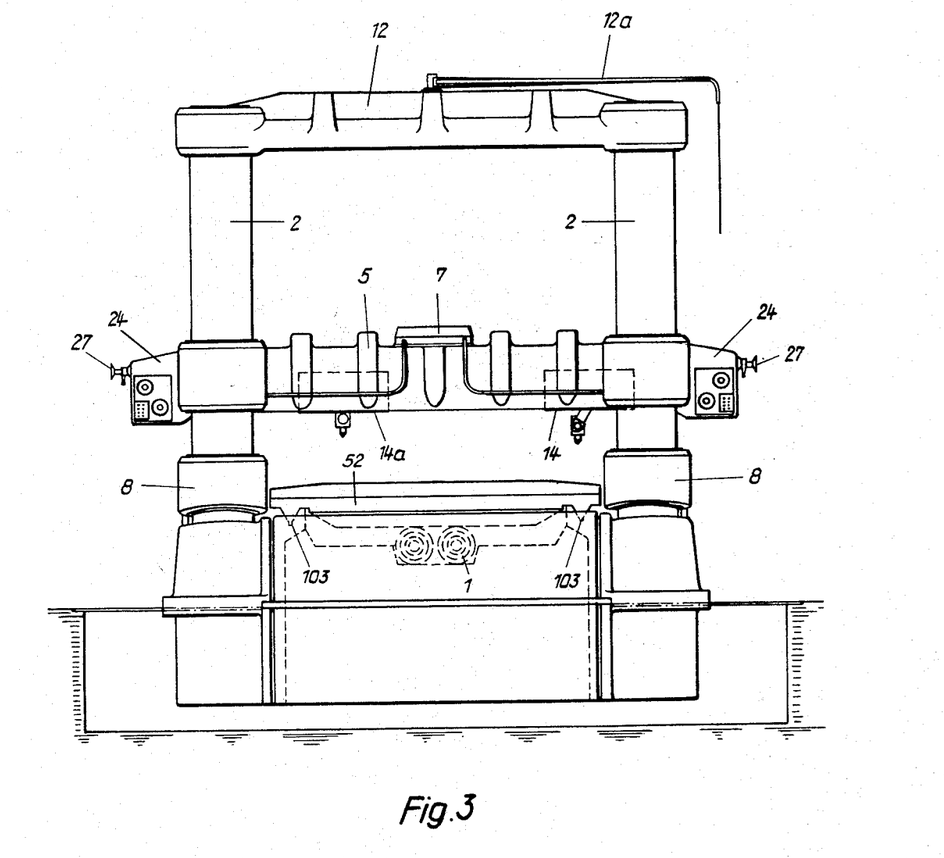
FIG. 3 is a front elevation of the machine according to FIG. 1.
Figure 6:
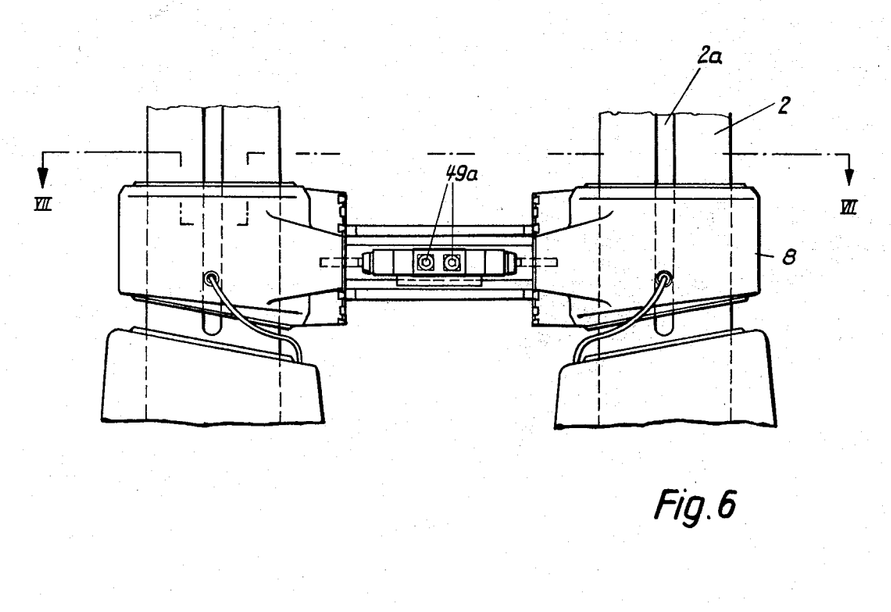
FIG. 6 is an elevation of one of the lateral cross beams.
Figure 7:
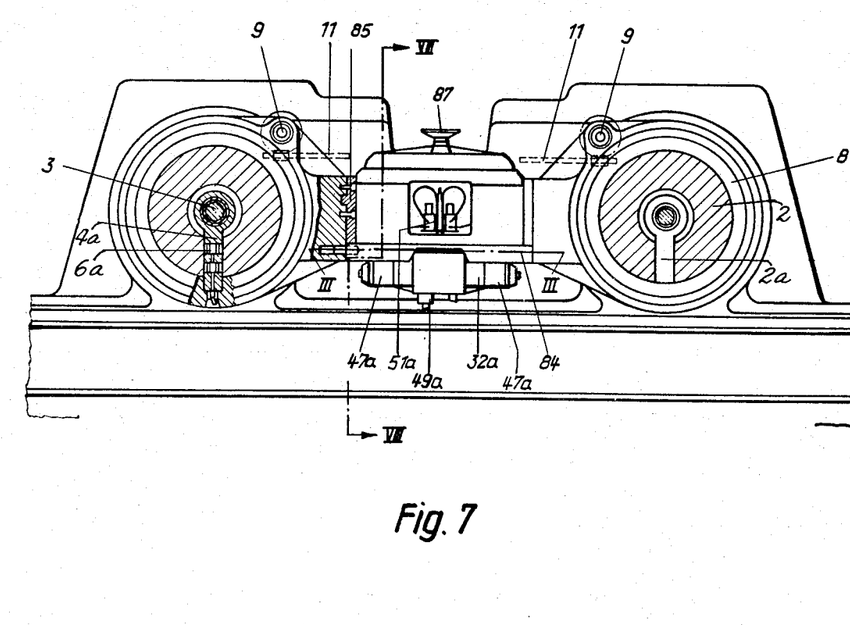
FIG. 7 is a plan view of a lateral cross beam with a section along line VII—VII of FIG. 6 of two hollow columns.
Figure 7A:
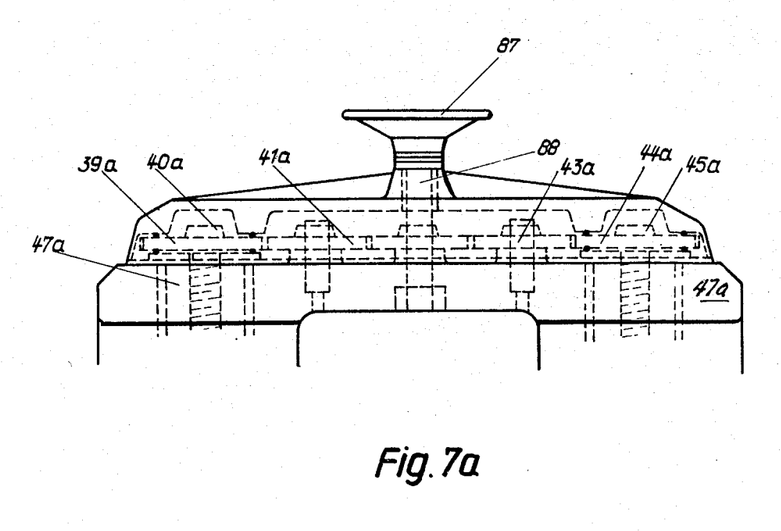
FIG. 7a is a plan view of a gearing in an enlarged scale.

The upright consists of four ground cylindrical hollow-columns 2 having longitudinal slots 2a at the inside (FIGS. 2 and 7). In the middle of each hollow column 2a a drive screw-threaded spindle 3 is arranged (FIG. 7). Carrier yokes 4 extend through the longitudinal slots 2a and engage the screw threaded spindles 3. The carrier yokes 4 are in turn attached to a main cross beam 5 (FIG. 5), which connects the four hollow columns 2 to one another and which is vertically slidable along the hollow columns 2 by the rotation of the mutually coupled screw threaded spindles 3. Suitable gearing can be provided for rotating the screw threaded spindles 3 in unison. The main cross beam 5 is capable of being hydraulically clamped to the four hollow columns 2 after being adjusted to the level position desired. For this purpose hydraulic pressure plungers 6 (FIGS. 4 to 6) are slidably arranged in suitable cylindrical chambers in the carrier yokes 4, which plungers frictionally engage the side faces of the longitudinal slots 2a and thereby lock said cross beam 5 against vertical movement and displacement. A hydraulic unit 7 of conventional type connected to the main cross beam 5 generates the required oil pressure which is supplied to the chambers of said plungers 6 simultaneously.

Figure 8:
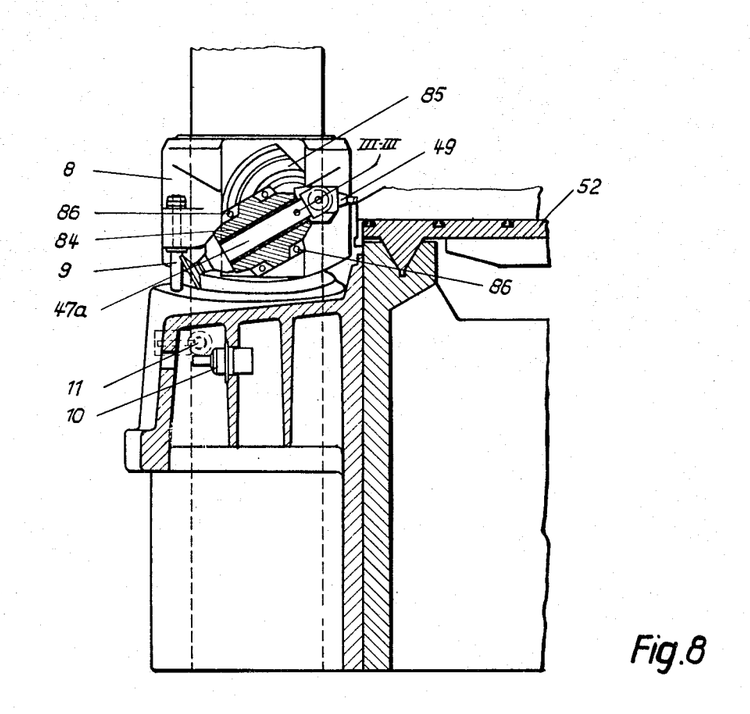
FIG. 8 is a section on line VIII—VIII of FIG. 7.

In addition to the main cross beam 5 a side cross beam 8 is arranged on any pair of the hollow columns 2 at both sides of the planing table 52. These lateral cross beams are likewise vertically slidable by means of lifting spindles 9 (FIGS. 1 and 7). They are provided with pressure plungers 6a engaging into the longitudinal slots 2a of the hollow columns and clamping the side cross beams fast to the hollow columns 2. The drive of the hollow spindles 9 by means of a motor 10 and a gearing 11 is shown in FIG. 8. By means of conventional controls care is taken that the hydraulic pressure plungers 6 and 6a, respectively, are relieved, when the drive of the spindles 3 and 9, respectively, is engaged.

The four hollow columns 2 are connected at their upper ends by a fixed head cross member 12. On the latter a rocker arm 12a is pivotally mounted on which an electrical command appliance 13 for the control of the planing machine is suspended. On said command appliance a universally movable telescope could be mounted for the accurate observing of machining operations.

Figure 9:
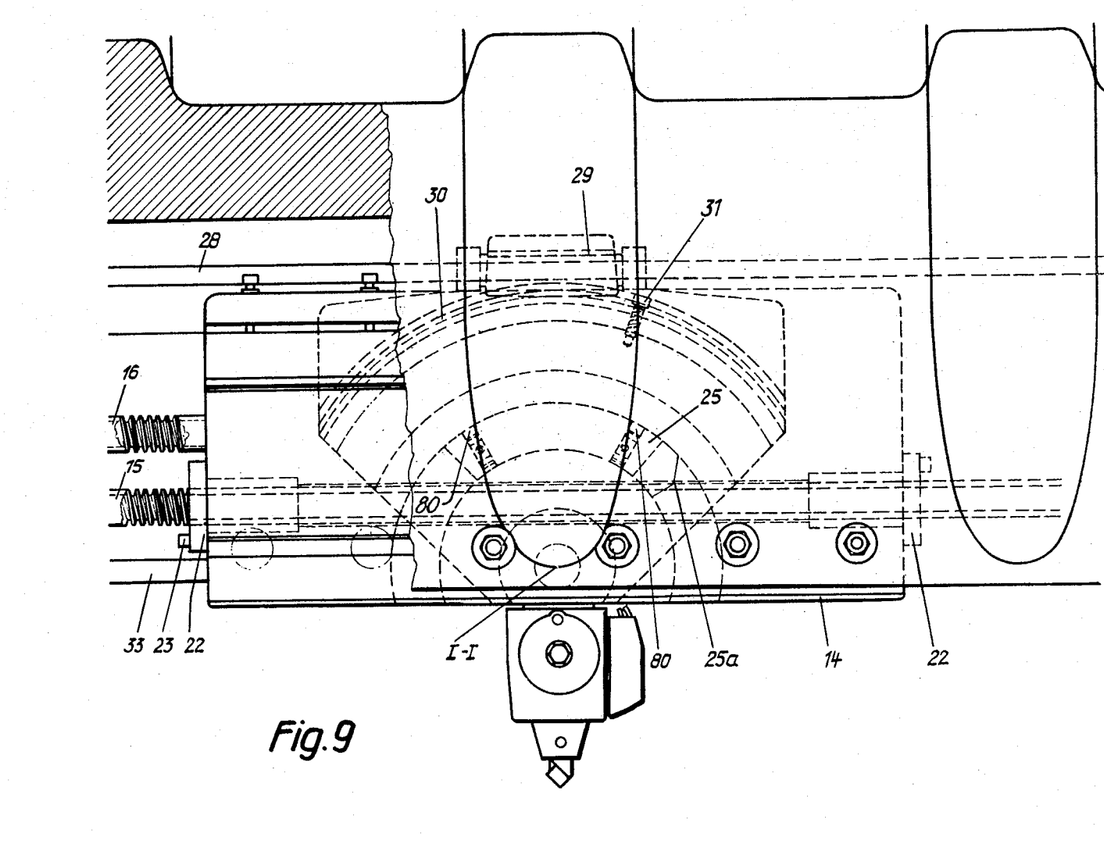
FIG. 9 is a front elevation of part of the main cross beam, partly in section, with a planing carriage.
Figure 10:
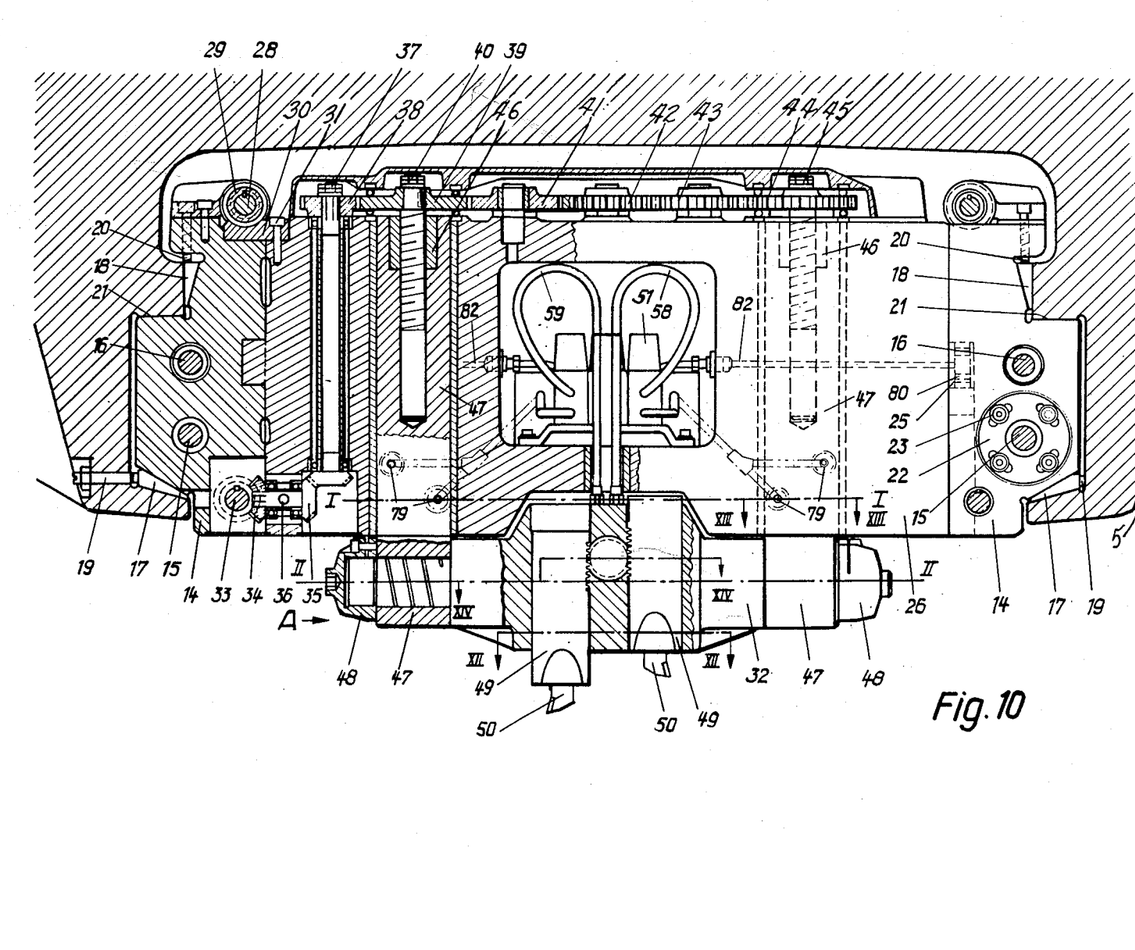
FIG. 10 is an elevation of a carrier of an alternate tool holder support, partly in section.
Figure 10A:
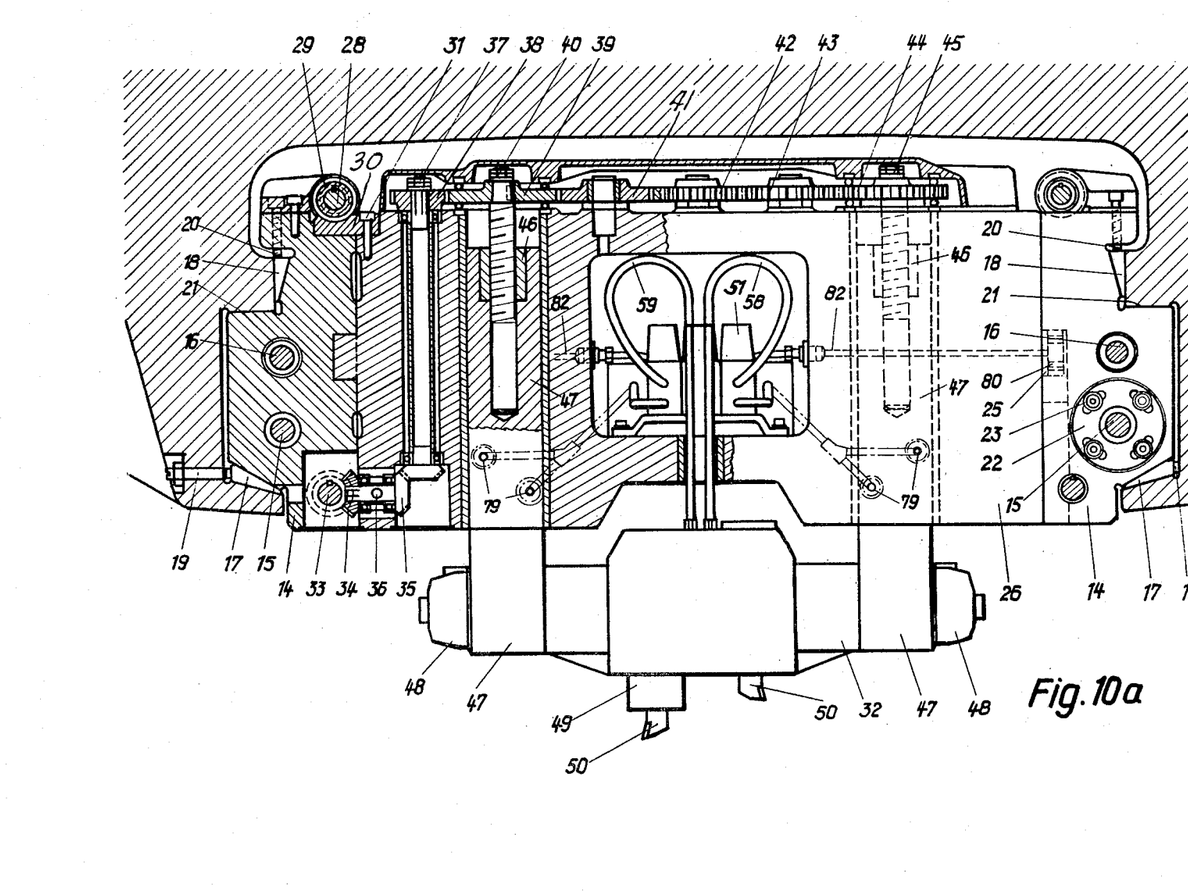
FIG. 10a is a view of the tool holder support in another position.
Figure 11:
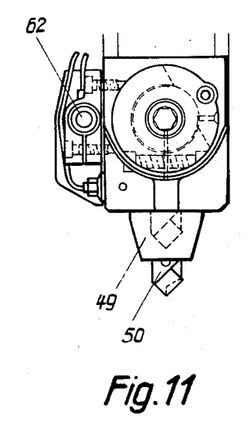
FIG. 11 is a front elevation of the alternate tool holder support as viewed in the direction A of FIG. 10.
Figure 12:
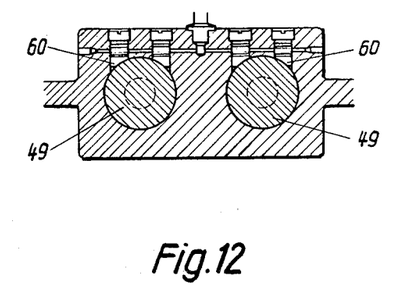
FIG. 12 is a section on the line XII—XII of FIG. 10.
Figure 13:
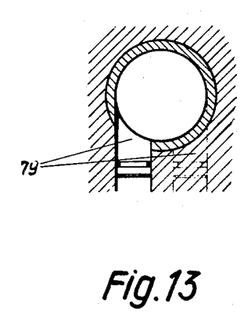
FIG. 13 is a section on the line XIII—XIII of FIG. 10.
Figure 14:
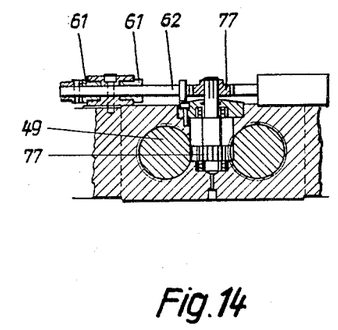
FIG. 14 is a section on line XIV—XIV of FIG. 10.

In the interior of the main cross beam 5, two planing carriages 14 and 14a are slidably mounted (FIGS. 3 and 9) in guide tracks directed accurately plane-parallel transversely of the planing table 52. For the lateral movement of the first planing carriage two screw-threaded spindles 15 are provided, and for the movement of the second planing carriage 14a two screw-threaded spindles 16 (FIGS. 9, 10). The planing carriage 14 has passage holes for the screw-threaded spindles 16 of the planing carriage 14a, and vice versa. The guidance free of play of the planing carriage 14 in the direction of planing is effected by wedge shaped gibs 17 and 18 arranged at both sides. The gibs 17 are loosely connected to the main cross beam 5 by means of adjustment screws 19, and have the same length as the guide tracks of the main cross beam. The gibs 18 are likewise loosely connected to the planing carriages 14 and 14a, respectively by means of adjustment screws 20, and accordingly the lengths of the said gibs and of the planing carriages are identical. All the wedge-shaped gibs have to fulfil conjunction with the main support tracks 21 the requirement of a constantly play-free guidance of the entire planing device both as regards level and longitudinal direction of planing. The two spindle nuts 22, which are rotatable but secured by means of clamping screws 23 allow a play-free lateral adjustment of the planing carriages 14 and 14a and screw-threaded spindles 15, which latter are journalled likewise free of play in the two gear boxes 24 (FIG. 3).

Between the two planing carriages 14 and 14a the planing tool support carrier 26 is arranged pivotally about the axis I—I (FIGS. 9 and 10) and radially guided by segments 25. The angular adjustment of the carrier 26 about the axis I—I is effected by a hand wheel 27 through a guide spindle 28 and worm 29 slidably keyed on it which engages a worm wheel segment 30 screwed to the carrier 26 by means of several screws 31.

In the carrier 26 an alternate tool holder support 32 is slidably mounted on two axles 47. The vertical adjustment of the alternate tool holder support 32 is effected by means of a horizontal guide spindle 33, adapted to be actuated by hand or by an electrically controlled automatic feed, the drive elements of which are built into the gear box 24 (FIG. 3). The guide spindle 33 transmits the rotational movements through two bevel gears 34 and 35 and the shaft 36 via the spindle 37 to the spur gear 38 keyed to it. The shaft 36 is coaxial with the axis I—I whereby an unhampered angular adjustment of the carrier 26 is attained. The spur gear 38 transmits the rotational movements through the spur gear 39 to the screw-threaded spindle 40, and through the intermediate gears 41, 42, 43 to the spur-gear 44 and the screw threaded spindle 45. Since both screw-threaded spindles 40 and 45 are journalled in play-free adjustable double threaded bushings or sleeves 46, and the outer nuts of the double threaded sleeves are fixedly anchored in the two vertical axles 47, a vertical shifting of the axles 47 is effected by rotation of the spindles and accordingly also of the alternative tool holder support 32 which is pivotally mounted on the latter pivotally about the axis II—II. Two nuts 48, each provided with a securing screw, clamp the support 32 fast at the angular position to which the same has been adjusted. The alternate tool holder support is consequently additionally rotatable about the axis II—II, so that the tools 50 can be readily adapted to the faces to be machined.

On the alternate tool holder support 32 the two alternate tool holders 49 are arranged, each of which is equipped with an oppositely orientated planing tool 50. The latter are ground accurately mirror-symmetrically on separate grinding appliances, and after being inserted until they abut the two alternate tool holders 49 they are secured by clamping screws and keys. The tools 50 may be made of a square profile, if desired.

Figure 15:
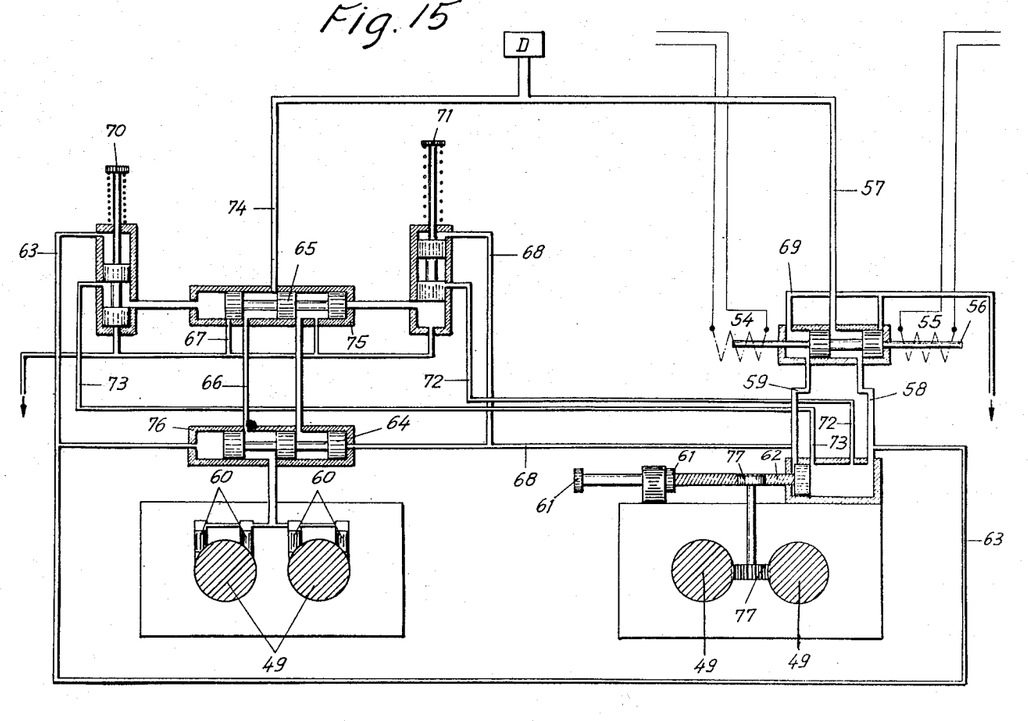
FIG. 15 diagrammatically shows the hydraulic control of the planing tools which are alternately moved into operative position.

The carrier 26 has a recess extending centrally thereof wherein an electro-hydraulic driving unit 51 of conventional type is mounted. The same serves for the reversing and for the clamping of the alternate tool holders 49. At the end of each working stroke of the planing table the tool holder 49 actually in the operative position is automatically retracted into the alternate tool holder support, and the other tool holder 49 is moved out into its operative position. Thereafter both tool holders are clamped in position by means of hydraulically operated clamping bolts. The diagram of FIG. 15 shows how the hydraulic devices for the reversing and locking of the alternate tool holders operates. This hydraulic device is of conventional construction. It does not form part of the invention and will be explained hereinafter in more detail only in conjunction with the reversing of the alternate tool holders.

When reversing the planing table 52 by means of the two longitudinally adjustable abutments 53 (FIG. 1), at the same time the electric current supply to the magnet coils 54 and 54 is mutually switched on and off, respectively. On the diagram illustrated the magnet coil 55 is energized and has accordingly pulled the slide valve 56 to the right up to its stop, whereby the pressure fluid supplied by a pump or a pressure accumulator D is supplied from the line 57 to the line 58. Since firstly the hydraulic clamping pins 60 for the locking of the alternate tool holders 49, are still on load, and consequently the slides 62 are not yet released, which are adjustable in length of stroke on the alternate tool holders 49 by means of two abutments 61 for being switched-over, the pressure fluid flows firstly through the line 63 and pushes the slide valve 64 into the position illustrated. At the same time also the spring biased control slide valve 70 is pushed downward. The slide valve 65 is however at this moment in the end position opposite of that one illustrated, whereby pressure relief of both alternate tool holders 49 can take place through the lines 66 and 67. The fluid displaced by switching-over the slide valve 64 has been drained through the lines 68, 59 and 69 into a reservoir (not shown).

As soon as the two slide valves 64 and 70 are in their end positions, the slide 62 is automatically shifted to its abutment position illustrated. Since the line 68 is relieved of pressure, the control slide valve 71 is in its upper end position and accordingly blocks the pressure line 72. When the slide 62 has reached the end of its stroke, it clears the pressure line 73, and accordingly the slide valve 65 is shifted to the right into its position illustrated. The pressure fluid from line 74 has again a free passage to the clamping pins 60 via the control valve 75, the line 66 and the control valve.

Summing up this means the following.

As long as the alternate tool holders 49 are loaded by the clamping pins 60, no force can act on the slide 62 which moves the two alternate tool holders 49 alternately up and down by means of a toothed rack and pinion 77. On the other hand no braking action of the clamping pins 60 can be applied to the alternate tool holders 49 as long as the slide 62 and accordingly also the alternate tool holders 49 are in motion. The connection between the electro-hydraulic driving unit 51 and the elements mounted on the support 31 of the alternate tool holders is formed by flexible high pressure hoses 78. An electrohydraulic locking system working on an identical principle comes into operation when loading and relieving, respectively, the axles 47 by the clamping pins 79. The difference consists primarily in that, instead of a slide 62, the guide spindle 33 serves as the driving element.

Figures 4, 5, 5A:
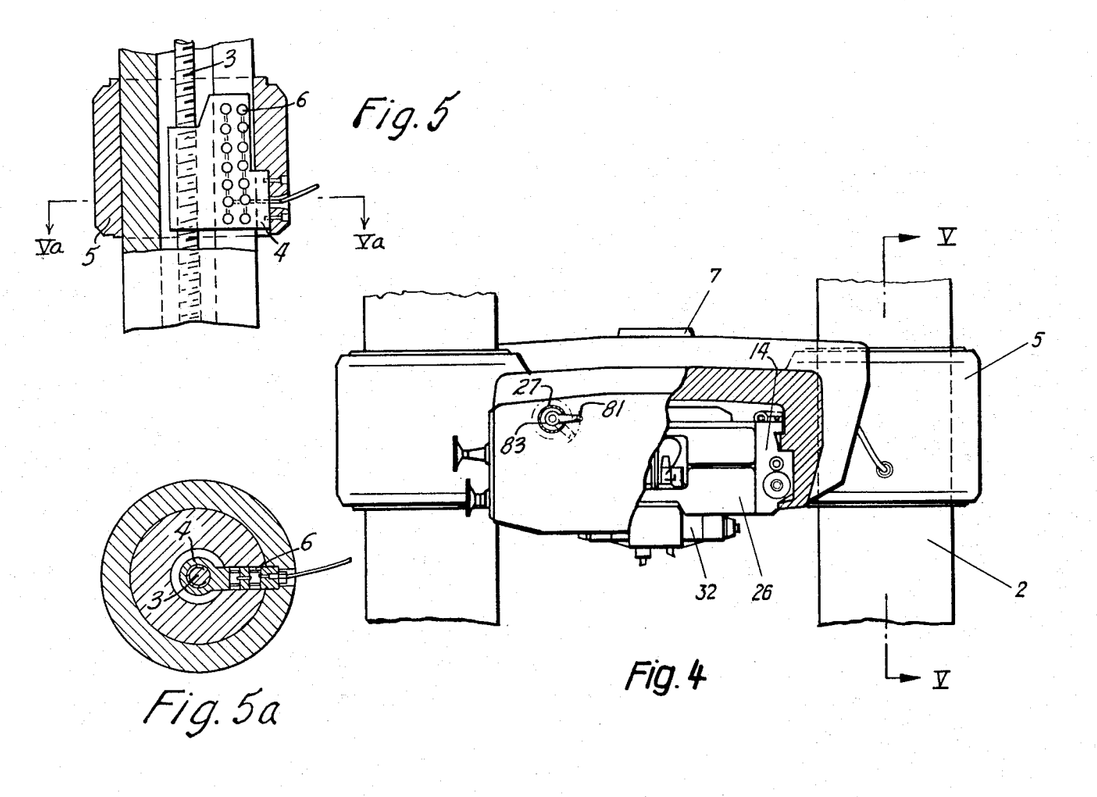
FIG. 4 is an elevation, partly in section, of the main cross beam.
FIG. 5 is a section on line V—V of FIG. 4.
FIG. 5a is a section on line Va—Va of FIG. 5.

During operation the carrier 26 is likewise hydraulically locked by means of clamping pins 80 arranged between the segment jaws (FIG. 9). The solenoid valve provided for the unlocking and locking is likewise arranged in the driving unit 51, and is switched on or off by a slight turning of the safety lever 81 (FIG. 4). In one of the two positions the supply lines 82 and clamping pins 80 are under hydraulic loading, and accordingly clamp the carrier 26 fast in the angular position adjusted to by means of the hand wheel 27. A scale 83 allows the direct adjustment of the planing angle of the carrier 26.

The lateral cross beams 8 are, as mentioned hereinabove, arranged vertically slidable and arrestable each on two hollow columns 2 on both sides of the planing table 52 (FIGS. 6 to 8). Each lateral cross beam 8 carries a planing support carrier 84, which is mounted pivotally about an axis III—III and is guided in a segment guide 85 (FIG. 8). The whole carrier 84 may be turned by hand about the axis III—III for adjusting the planing angle. For this purpose the screws 86 are released and, after the adjustment to the planing angle desired, they are tightened again. In the carrier 84 an alternate tool holder support 32a is mounted on axles 47a, the construction of which corresponds to that of the support 32 of the carrier 26 of the main cross beam 26. The only difference consists in that the axial adjustment of the axles 47a can be made only by hand, namely by turning the hand wheel 87 the rotation of which is transmitted to the screw threaded spindles by means of spur gears.

The reversing and the hydraulic locking of the alternate tool holders 49a as well as the clamping fast of the axles 47a of the support 32a takes place by means of a hydraulic unit 51a in the same manner as described for the main cross beam.

Figure 16:
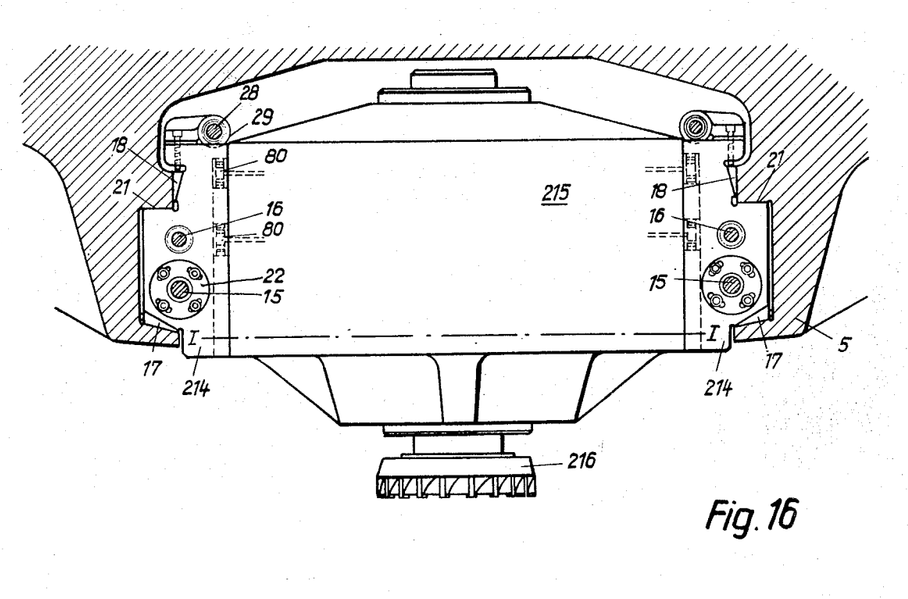
FIG. 16 is a side elevation of a milling carriage inserted into the main cross beam with a milling cutter support.
Figure 17:
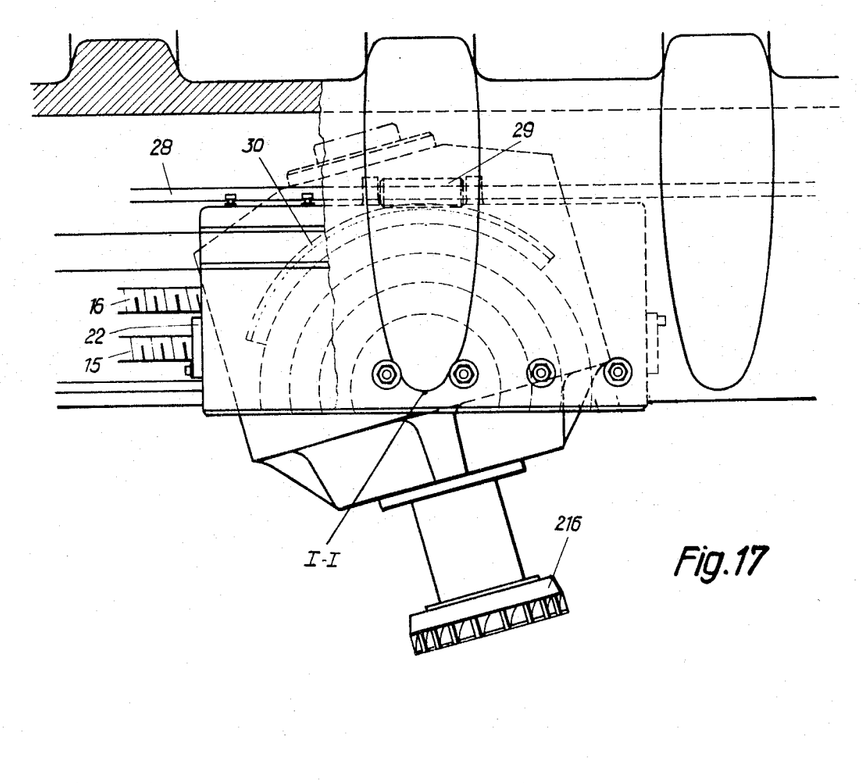
FIG. 17 is a front elevation of the milling support according to FIG. 16.

When the machine tool has to serve for milling, the milling carriages 214 and 214a respectively are inserted into the guide tracks 21 of the main cross beam 5, instead of the planing carriages 14 and 14a, respectively (see FIGS. 16 and 17). These milling carriages are mounted without play like the planing carriages in the main cross beam 5 on both sides by means of wedge-profile gibs 17 and 18. For the lateral shifting of the milling carriage 214 serve the two screw-threaded spindles 15, and for the shifting of the milling carriage 214a (not shown), which corresponds to the planing carriage of FIG. 3, serves the screw threaded spindle 16.

The milling cutter support 215 is mounted between the two milling carriages 214 pivotally about the axle I—I, and likewise the second milling cutter support (not shown) between the milling carriages 214a. Likewise, forward and return planing-, milling- or grinding-units may be put into operation at the same time. The angular adjustment is effected, as with the planing carriages, by means of the guide spindle 28, the worm 29 and the worm wheel segment 30. For the hydraulic locking of the milling cutters support likewise clamping bolts 80 are provided, which engage between the segment jaws. The milling cutter 216 is driven in the conventional way through gearing an electric motor (not shown), built into the milling cutter support 216.

Alternatively a hydraulic servo-motor drive could be built in. Instead of the milling cutter 216 illustrated an angular milling cutter turned 90° could be used.

While I have described herein and illustrated in the accompanying drawings what may be considered typical and particularly useful embodiments of my said invention, I wish it to be understood that I do not limit myself to the particular details and dimensions described and illustrated; for obvious modifications will occur to a person skilled in the art.

What I claim as my invention and desire to secure by Letters Patent is:

1. A machine tool for machining a work piece on a forward stroke and on a return stroke, comprising in combination: a machine bed, a horizontal work table guided on the said machine bed, at least four vertical columns rigidly connected at their lower ends to the said machine bed arranged in spaced apart pairs on both sides thereof, a head cross member mounted at the upper ends of the said columns and extending therebetween for bracing the same with respect to one another, a main cross beam slidably mounted for vertical movement, on the said columns, guide tracks provided on the said main cross beam and wedge-profile gibs arranged in the said guide tracks for the play-free adjustment thereof, at least one planing carriage mounted on the said guide tracks and gibs shiftably across the whole width of the said working table, screw-threaded spindles mounted in the said main cross beam and engaging the said planing carriage for the transverse movement thereof, screw-threaded spindles in driving connection with the said main cross beam for the vertical moving of the latter along the said columns, hydraulic clamping elements carried by said main cross beam for locking the same to the said columns, a second planing carriage, a carrier pivotally mounted on said main cross beam about a transverse axis between the said two planing carriages, an alternate tool holder support mounted on the said carrier, two carrier axles mounted vertically slidable in the said support, and gearing operatively connecting the said carrier and support for vertically moving the said support relative to the said carrier.

2. A machine tool as claimed in claim 1, including hydraulic clamping means arranged in said carrier and when operated engaging and arresting the said carrier axles.

3. A machine tool for machining a workpiece on a forward stroke, and on a return stroke, comprising in combination: a machine bed, a horizontally reciprocatable work table guided on the said machine bed, at least four vertical columns arranged in spaced apart pairs at each side of said bed rigidly connected at their lower ends to the said machine bed, a head cross member mounted on and connecting the upper ends of the said columns for bracing the same with respect to one another, a main cross beam mounted for vertical sliding movement on the said columns, a lateral cross beam mounted vertically slidable on the columns on each side of the said machine bed, machining tools mounted on the said main cross beam and on the said lateral cross beams, respectively, screw-threaded spindles in driving connection with the said main cross beam and with the said lateral cross beams, respectively, for vertically moving the same along the said columns, and hydraulic clamping elements capable of engaging and clamping the said main cross beam and the said lateral cross beams, respectively, to the said columns.

References Cited by the Examiner

UNITED STATES PATENTS

| | | | |
|---|---|---|---|
| 182,837 | 10/76 | Macomber | 90—34 |
| 1,535,875 | 4/25 | Sutton | 90—53 |

(Other references on following page)

UNITED STATES PATENTS

| | | | |
|---|---|---|---|
| 1,549,017 | 8/25 | Mundell | 90—49 |
| 1,555,055 | 9/25 | Cardullo | 90—37 |
| 1,751,931 | 3/30 | Legge | 51—56 |
| 1,771,857 | 7/30 | Mesker et al. | 90—37 |
| 1,773,388 | 8/30 | Canning | 51—56 |
| 1,976,713 | 10/34 | Cardullo | 90—37 |
| 2,319,551 | 5/43 | Linden et al. | 77—28 |
| 2,516,294 | 7/50 | Berthiez | 90—34 |
| 2,624,244 | 1/53 | Morey | 90—53 |
| 2,730,022 | 1/56 | Waldrich | 90—53 |

FOREIGN PATENTS

| | | |
|---|---|---|
| 129 | 7/77 | Germany. |
| 44,393 | 8/18 | Sweden. |

WILLIAM W. DYER, Jr., *Primary Examiner.*

LEON PEAR, J. SPENCER OVERHOLSER, JOHN C. CHRISTIE, *Examiners.*